(12) United States Patent
Gopalakrishnan et al.

(10) Patent No.: US 9,087,287 B2
(45) Date of Patent: Jul. 21, 2015

(54) INDIVIDUALIZING REDUCTION OF ORIGINAL PAGES IN N-UP COPYING OR PRINTING

(71) Applicant: Xerox Corporation, Norwalk, CT (US)

(72) Inventors: Sainarayanan Gopalakrishnan, Chennai (IN); Sudhagar Subbaian, Coimbatore (IN); Clara Cuciurean-Zapan, Fairport, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 125 days.

(21) Appl. No.: 13/799,017

(22) Filed: Mar. 13, 2013

(65) Prior Publication Data

US 2014/0268185 A1 Sep. 18, 2014

(51) Int. Cl.
*G06K 15/02* (2006.01)
*H04N 1/387* (2006.01)

(52) U.S. Cl.
CPC .......... *G06K 15/1848* (2013.01); *H04N 1/3875* (2013.01)

(58) Field of Classification Search
CPC ................. G06F 3/1297; G06K 15/02; G06K 2215/0071; G06K 2215/0088; G06K 15/1848; H04N 1/3875
USPC ............................................... 358/1.12, 1.18
See application file for complete search history.

(56) References Cited

U.S. PATENT DOCUMENTS

| | | | |
|---|---|---|---|
| 5,495,561 A | 2/1996 | Holt | |
| 6,032,004 A | 2/2000 | Mirabella, Jr. et al. | |
| 6,417,931 B2 | 7/2002 | Mori et al. | |
| 6,580,521 B1 | 6/2003 | Nishikawa et al. | |
| 6,667,814 B1 | 12/2003 | Tillotson | |
| 7,099,037 B2 | 8/2006 | Clark et al. | |
| 7,248,386 B2 | 7/2007 | Nishi | |
| 7,405,840 B2 | 7/2008 | Yamaguchi | |
| 7,589,862 B2 | 9/2009 | Uchida et al. | |
| 7,659,999 B2 | 2/2010 | Karn et al. | |
| 7,990,555 B2 | 8/2011 | Kato et al. | |
| 8,050,587 B2 | 11/2011 | Kurihara | |
| 8,260,061 B2 | 9/2012 | Hirohata | |
| 8,335,010 B2* | 12/2012 | Morimoto et al. | 358/1.18 |
| 8,610,931 B2* | 12/2013 | Nakata | 358/1.15 |
| 8,810,848 B2* | 8/2014 | Nakajima et al. | 358/1.18 |
| 2002/0036788 A1* | 3/2002 | Hino | 358/1.11 |
| 2002/0067507 A1* | 6/2002 | Kujirai | 358/1.18 |
| 2003/0020956 A1* | 1/2003 | Goel et al. | 358/1.18 |
| 2003/0160975 A1 | 8/2003 | Skurdal et al. | |

(Continued)

*Primary Examiner* — Benny Q Tieu
*Assistant Examiner* — Quyen V Ngo
(74) *Attorney, Agent, or Firm* — Gibb & Riley, LLC

(57) ABSTRACT

In response to N-up instructions methods and systems analyze the sizes of printable items within full-size pages to be printed, and determine the minimum size to which each of the full-size pages can be reduced to keep all the printable items above a minimum print item or font size. Because different pages of the print/copy job can have differently sized printable items, at least two of the full-size pages can have a different minimum size to which they can be reduced. Such methods and systems automatically reduce the sizes of the full-size pages (as limited by each potentially different minimum size of each different full-size page) to produce reduced-size pages that will be combined on output pages. Again, because each different full-size page can have a different minimum size, at least two of the full-size pages can be reduced by different reduction amounts during the reduction process.

20 Claims, 6 Drawing Sheets

(56) References Cited

U.S. PATENT DOCUMENTS

| | | | |
|---|---|---|---|
| 2004/0047002 A1* | 3/2004 | Nishi | 358/1.18 |
| 2005/0094208 A1* | 5/2005 | Mori | 358/1.18 |
| 2005/0179932 A1* | 8/2005 | Matsuda | 358/1.14 |
| 2007/0070374 A1 | 3/2007 | Boyes, Jr. et al. | |
| 2008/0225306 A1* | 9/2008 | Shepherd et al. | 358/1.2 |
| 2009/0040561 A1 | 2/2009 | Sasaki | |
| 2010/0315656 A1* | 12/2010 | Agata | 358/1.2 |
| 2012/0002226 A1* | 1/2012 | Zhan | 358/1.11 |

* cited by examiner

INDIVIDUALIZING REDUCTION OF ORIGINAL PAGES IN N-UP COPYING OR PRINTING

BACKGROUND

Systems and methods herein generally relate to printing devices and systems, and more particularly to devices and systems that print multiple reduced-size pages on a single page in a process referred to as N-up copying or printing.

Many modern printing devices have an environmentally friendly feature that is referred to as "multi-up" or "N-up" printing. In N-up copying or printing, the full-size pages within an original print/copy job are reduced in size so that more than one page of the print/copy job can be printed on each sheet/page of paper. This process produces environmental advantages by using less paper and toner/ink. The "N" represents the number of original full-size pages that will be printed on each individual sheet/page. Therefore, for example 2-up printing prints two original pages on each sheet. Similarly, 4-up printing prints four pages on each sheet; 6-up printing prints six pages on each sheet; etc. Further, 4-up uses only one quarter of the number of sheets/pages of paper because each sheet contains four of the full-size pages from the original print/copy job reduced to approximately one quarter of their original size.

Therefore, in N-up copying or printing the "N" value can be pre-set, or can be input through user selection. However, when reducing the size of the original pages within the print/copy job, sometimes it becomes difficult to recognize the font, graphical items, images, etc., within the N-up copied or printed sheets/pages because of the size reduction.

SUMMARY

Exemplary methods herein receive (into a computerized device) a job (e.g., print job, copy job, etc.) for printing on sheets/pages of media. The print/copy job contains full-size pages, the sheets/pages of media have a uniform size, and the print/copy job contains initial instructions to print each of the full-size pages on a single sheet of the sheets/pages of media. These methods also automatically or manually receive (into the computerized device) secondary instructions (e.g., N-up instructions) to combine at least two of the full-size pages on at least one sheet of the sheets/pages of media.

In response, these exemplary methods automatically analyze the sizes of the printable items (e.g., the font sizes of the printable items) within the full-size pages, and automatically determine the minimum size to which each of the full-size pages can be reduced to keep all the printable items above a minimum print item or font size, using the computerized device. Because different pages of the print/copy job can have differently sized printable items, at least two of the full-size pages can have a different minimum size to which they can be reduced (based on different print item or font sizes of the printable items within each of the different full-size pages).

Then, such methods automatically reduce the sizes of the full-size pages (as limited by each potentially different minimum size of each different full-size page) to produce reduced-size pages (again, using the computerized device). Again, because each different full-size page can have a different minimum size, at least two of the full-size pages can be reduced by different reduction amounts during the reduction process.

Following this, these methods automatically combine the reduced-size pages onto secondary pages (e.g., N-up pages) as limited by the uniform size of the sheets/pages of media (using the computerized device). Because the full-size pages can be reduced by different reduction amounts during the reduction process, at least two of the secondary pages (N-up pages) can contain different amounts (different N numbers) of the reduced-size pages.

When combining the reduced-size pages onto the sheets/pages of media, the methods herein can optionally change the orientation of the reduced-size pages, with respect to the original orientation of the sheets/pages of media that was set in the print/copy job for the full-size pages. When doing so, such methods can keep the same orientation of all the reduced-size pages on each individual page of the N-up pages so that all items on each N-up page have the same orientation.

Thus, not only can at least two of the secondary pages (N-up pages) contain different amounts of the reduced-size pages, the reduced-size pages appearing on the secondary pages (N-up pages) can have different, individualized reduction amounts with respect to other reduced-size pages. Further, either different reduced-size pages can have different reduction amounts on different secondary (N-up) pages, or different reduced-size pages can have different reduction amounts on the same secondary (N-up) page. After this, the finalized N-up pages can be automatically output (printed, displayed, transmitted) from the computerized device for printing or viewing.

In additional systems and methods, such methods can display a draft of the N-up pages for the user to review before outputting or printing, and the user can be provided an option to accept or reject the N-up pages; or an option to change the minimum item or font size. This optionally allows the user final choice over the automated N-up copying or printing described above, where different full-size pages are reduced by different amounts on the combined pages of the N-up print/output.

Exemplary printing devices herein comprise a processor, an input/output device operatively connected to the processor, and a printing engine operatively connected to the processor. The input/output device receives a print/copy job for printing on sheets/pages of media. Again, the print/copy job contains full-size pages, the sheets/pages of media have a uniform size, and the print/copy job contains initial instructions to print each of the full-size pages on a single sheet of the sheets/pages of media.

The input/output device also automatically or manually receives secondary (N-up) instructions to combine at least two of the full-size pages on at least one sheet of the sheets/pages of media. The processor automatically analyzes the item or font sizes of printable items within the full-size pages, and the processor automatically determines a minimum size to which each of the full-size pages can be reduced to keep all the printable items above a minimum font size. At least two of the full-size pages have a different minimum size to which the full-size pages can be reduced based on different font sizes of the printable items within the full-size pages.

The processor automatically reduces the sizes of the full-size pages as limited by each page's minimum size to produce reduced-size pages. Thus, at least two of the full-size pages are reduced by different reduction amounts. Then, the processor automatically combines the reduced-size pages onto N-up pages (leaving a minimum space between the reduced-size pages) as limited by the uniform size of the sheets/pages of media. At least two of the N-up pages contain different amounts of the reduced-size pages. Then, the printing engine automatically prints the finalized N-up pages.

Again, the processor can change the orientation of the reduced-size pages with respect to an orientation of the sheets/pages of media when combining the reduced-size pages onto the sheets/pages of media. As mentioned above, in doing so, the processor can keep the same orientation of all the reduced-size pages on each individual page of the N-up pages. A graphic user interface can be operatively connected to the processor and can display the N-up pages and providing a user option to accept or reject the N-up pages, or an option to change the minimum font size.

These and other features are described in, or are apparent from, the following detailed description.

BRIEF DESCRIPTION OF THE DRAWINGS

Various exemplary systems and methods of the systems and methods are described in detail below, with reference to the attached drawing figures, in which.

DETAILED DESCRIPTION

Figure 1:
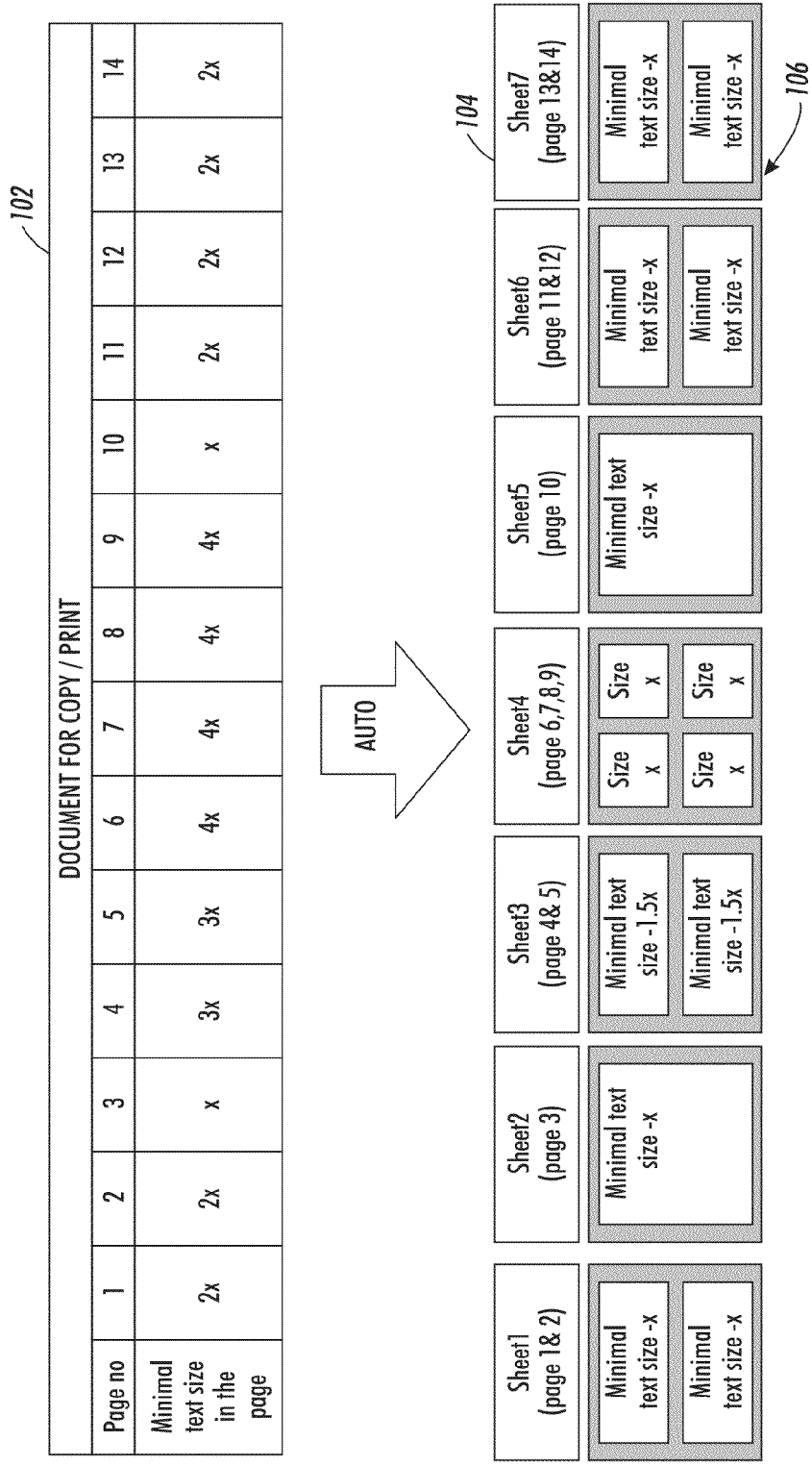
FIG. 1 is a block diagram illustrating operations of various systems and methods herein.

As mentioned above, in N-up copying or printing, sometimes it becomes difficult to recognize the fonts, graphical items, images, etc., within the N-up copied or printed sheets/pages because of the size reduction of such sheets/pages. Therefore, the systems and methods herein provide an automated method for selection of "N" within each of the N-up copied or printed sheets/pages in an N-up print or copy job (where N can vary from printed page to printed page). These systems and methods can use segmentation to detect various regions, such as text regions, graphic regions, image regions, etc., in the scanned image or print/copy job. Based on the text sizes and other print item sizes in the document, the systems and methods herein intelligently decide on the number of pages (value of N) to be printed on each N-up sheet, independently of other N-up sheets within the single print/copy job.

This is more economically and ecologically efficient than conventional N-up copying or printing on multifunction devices. Conventional N-up copying or printing on multi-function devices utilize a single fixed "N" number for the entire print/copy job, when reducing the size of the sheets/pages in the original copy or print or job, so as to fit multiple pages of the original document on each N-up output (copied, printed or otherwise reproduced) sheet/page. Because conventional systems utilize a single fixed "N" number (preset or selected by the user) when processing an entire job, the "N" number is selected so that the sheet with the smallest text (or other object of interest) can still be legible. There may be other pages within the original job that could be reduced to a smaller size and still be legible; however, they are not reduced as much as they could be because of another page within the original job that contains a smaller text or object.

The systems and methods herein individually reduce the size of each page within the original print/copy job down to a minimum allowable font size or item size for any particular page. The minimum font size or item size allows different amounts of original pages to be included on different N-up copied or printed sheets/pages, depending upon the amount of reduction applied to each of the original pages in the print (or otherwise reproduced) job. This provides a variable "N" number within N-up copying/printing, where "N" changes from printed page to printed page.

The minimum font size or item size ensures that all text and other items will be readable/visible on the N-up copied or printed sheets/pages, but also allows certain original sheet to be reduced more than others (when such sheets/pages have large enough text (or other printable items) to allow the additional reduction amount). The more the pages in the original job are reduced increases the number of original pages that can be included within each N-up copied or printed page, thereby decreasing the number of N-up sheets/pages that will be printed (reducing the overall amount of media consumed). This saves resources, which is economically and ecologically beneficial.

The systems and methods herein can partition the scanned image or print/copy job into different items such as text, graphical items, images, etc. and can apply a different minimum allowable size to each different region depending upon what that region contains.

In one example, a minimum allowable font size can be applied to text regions. While printing or copying, the size range of the text in every page of the document is analyzed: if the minimum size of text is greater than 2× in two consequent pages, then 2 pages are printed in one sheet of paper, if the minimum size of text is greater than 4× in four consequent pages, then 4 pages are printed in one sheet of paper. If the minimum size of text is less than 2×, then 1 page is printed on one sheet of paper. This can be extended to any number, 6×, 8×, 10×, etc. Regarding the calculation of text size, the interpreter will have the information of text size; while in copy jobs advanced text segmentations can be used to identify the texts, to allow the size of the text to be derived. Therefore, in a print/copy job issued from a computerized device, the font size is generally included in the printing instructions. To the contrary, in a scanned job, the font size can be inferred from various observations. Calculation on 'N' can be derived from the font sizes in consecutive pages. A local decision can be made.

In another example, graphical items may be considered insignificant or may be considered to be recognizable at any reduction amount. Therefore, there could be no minimum items size for graphical items. In another example, it may be undesirable to reduce images. Therefore, there may be no reduction allowed for images (and any page containing an image may not be reduced, and will be printed by itself on a single page). To the contrary, images could be considered similar to graphical items and could have virtually no minimum item size. Additionally, maximum percentage reduction limits can be applied to all graphical items and images. Such decisions regarding the amount that graphical items or images can be reduced during N-up copying or printing can be set in advance, or can be set according to user-selectable preferences.

If a page in the original print or job contains both text and graphical items or images, different calculations can be made to determine the amount of reduction that can be applied to each different section of the original page. According to one set of preferences, the amount of reduction could be based upon only one type region (either textual regions, graphical regions, or image regions). If multiple types of regions are considered in the reduction analysis, the feature to which the least amount of reduction can be applied will be the limiting factor for reduction of an original sheet that contains both text and graphics. Whichever element has the highest minimum allowable font/item size (the printable item that has the smallest reduction amount (produces the least amount of reduction)) will be the limiting factor for how much an individual original print/copy job page can be reduced.

Therefore, in one example, if an original page in a print/copy job contains both text and a graphical item, and no reduction is allowed for graphical items, no reduction will occur on the page, despite the text having a font size that is larger than the minimum allowable font size. In different settings are chosen, the entire page may be reduced according to the reduction necessary to reduce the original font size down to the minimum allowable font size. Again, all such options can be fixed or left available for user manipulation.

Figure 2:
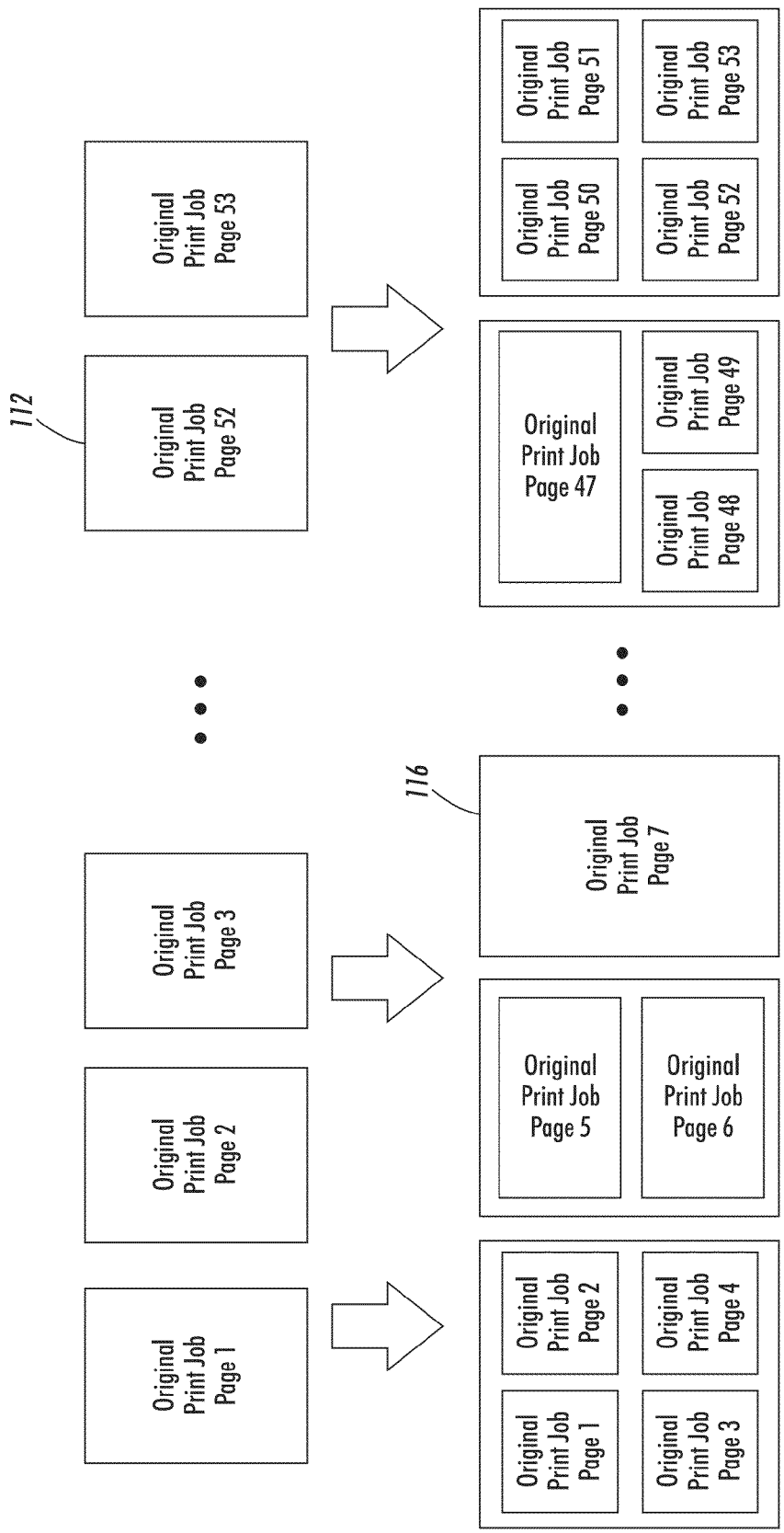
FIG. 2 is a block diagram illustrating operations of various systems and methods herein.

FIGS. 1 and 2 illustrate the automated conversion of an original job into an N-up job according to the systems and methods herein. More specifically, FIG. 1 illustrates a table 102 containing the information about each of the original pages in the original print or job. Item 104 shows which pages were combined together to produce the pages of the N-up job, and item 106 illustrates how the pages of the N-up job will appear when printed. As shown in FIG. 1, some of the pages of the original print or job will not be reduced in size in the pages of the N-up job. To the contrary, other pages of the original print or job will be reduced to allow 2 original pages per page of the N-up job or 4 original pages per page of the N-up job. Thus, the original pages within a single print/copy job 102 are shown in item 106 to be processed differently using a variable N number, in a single N-up job conversion process.

FIG. 2 also illustrates various pages of an original print or job 112 that are converted into secondary pages of another print/copy job (the N-up print/copy job). As shown in items 116 in FIG. 2, different reduction amounts are applied to original pages 1-4 (combined on the first N-up page) when compared to the reduction amount applied to pages 5 and 6, and to page 7. Further, the orientation of pages 5 and 6 (combined on the second N-up page) is different when compared to the orientation of the original print/copy job (and when compared to the orientation of other N-up pages). In addition, item 116 illustrates that multiple original pages can have different orientations within a single secondary page (note that original page 47 has a different orientation than original pages 48 and 49 within a single N-up page).

Figure 3:
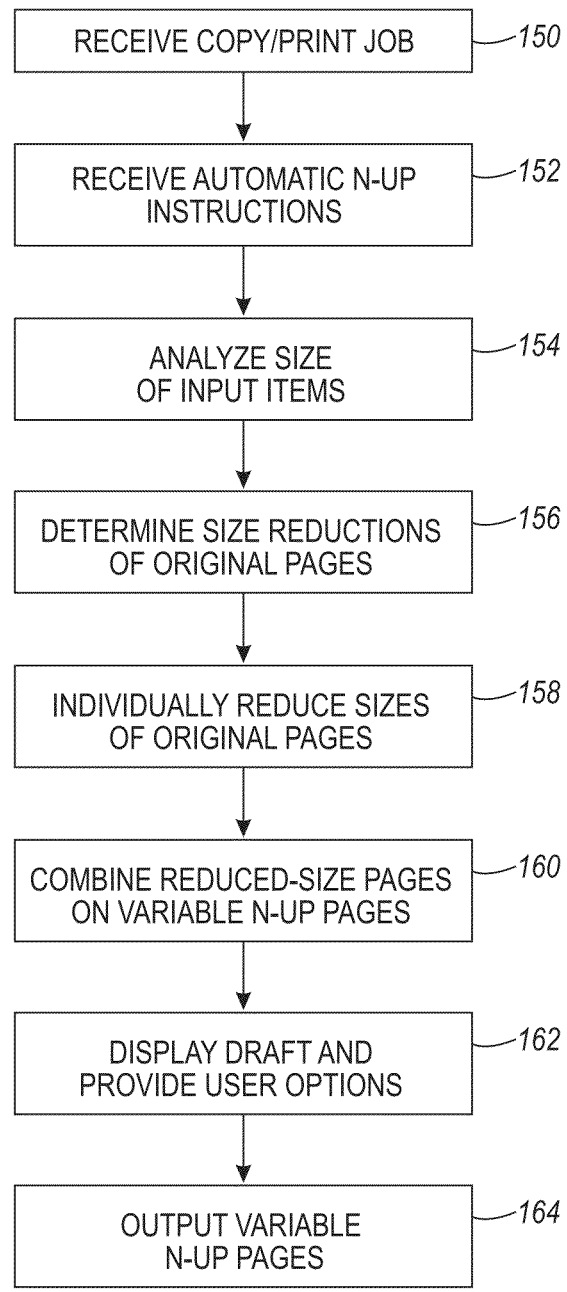
FIG. 3 is a flow diagram illustrating operations of various systems and methods herein.

FIG. 3 is flowchart illustrating features of exemplary methods herein. In item 150, methods herein receive (into a computerized device) a copy/print job for printing on sheets/pages of media. The print/copy job contains full-size pages, the sheets/pages of media have a uniform size, and the print/copy job contains initial instructions to print each of the full-size pages on a single sheet of the sheets/pages of media. These methods also automatically or manually receive (into the computerized device) secondary instructions (e.g., N-up instructions) or other similar command to combine at least two of the full-size pages on at least one sheet of the sheets/pages of media, as shown by item 152.

In response, in item 154, these exemplary methods automatically analyze the sizes of the printable items (e.g., the font sizes of the printable items) within the full-size pages, and automatically determine (individually, for each page in the original job) the minimum size to which each of the full-size pages can be reduced in item 156 to keep all the printable items above a minimum print item or font size, using the computerized device. Because different pages of the print/copy job can have differently sized printable items, at least two of the full-size pages can have a different minimum size to which they can be reduced (based on different print item or font sizes of the printable items within each of the different full-size pages).

Then, in item 158, such methods automatically individually reduce the sizes of the full-size pages (as limited by each potentially different minimum size of each different full-size page) to produce reduced-size pages (again, using the computerized device). Again, because each different full-size page can have a different minimum size, at least two of the full-size pages can be reduced by different reduction amounts during the reduction process.

Following this, in item 160 these methods automatically combine the reduced-size pages onto secondary pages (e.g., N-up pages) as limited by the uniform size of the sheets/pages of media (using the computerized device) leaving a minimum space between the reduced-size pages on each of the secondary pages. Because the full-size pages can be reduced by different reduction amounts during the reduction process, at least two of the secondary pages (N-up pages) can contain different amounts (different "N" numbers) of the reduced-size pages. For example, as discussed above, in item 160 if the minimum size of text is greater than 2× in two consequent pages, then 2 pages are combined on one secondary page of the N-up job. If the minimum size of text is greater than 4× in four consequent pages, then 4 pages are combined on one secondary page of the N-up job. If the minimum size of text is less than 2×, then 1 page is used on one secondary page of the N-up job.

When combining the reduced-size pages onto the sheets/pages of media in item 160, the methods herein can optionally change the orientation of the reduced-size pages, with respect to the original orientation of the sheets/pages of media that was set in the print/copy job for the full-size pages. When doing so, such methods can keep the same orientation of all the reduced-size pages on each individual page of the N-up pages so that all items on each N-up page have the same orientation (or can use different orientations within a single N-up page).

Thus, not only can at least two of the secondary pages (N-up pages) contain different amounts of the reduced-size pages, the reduced-size pages appearing on the secondary pages (N-up pages) can have different, individualized reduction amounts with respect to other reduced-size pages. Further, either different reduced-size pages can have different reduction amounts on different secondary (N-up) pages, or different reduced-size pages can have different reduction amounts on the same secondary (N-up) page. After this, the finalized N-up pages can be automatically output (printed, displayed, transmitted) from the computerized device for printing or viewing.

In addition, such methods can display a draft of the N-up pages for the user to review in item 162 before outputting or printing in item 164, and the user can be provided an option to accept or reject the N-up pages; or an option to change the minimum item or font size in item 162. This optionally allows the user final choice over the automated N-up copying or printing described above, where different full-size pages are reduced by different amounts on the combined pages of the N-up print/output.

Figure 4:
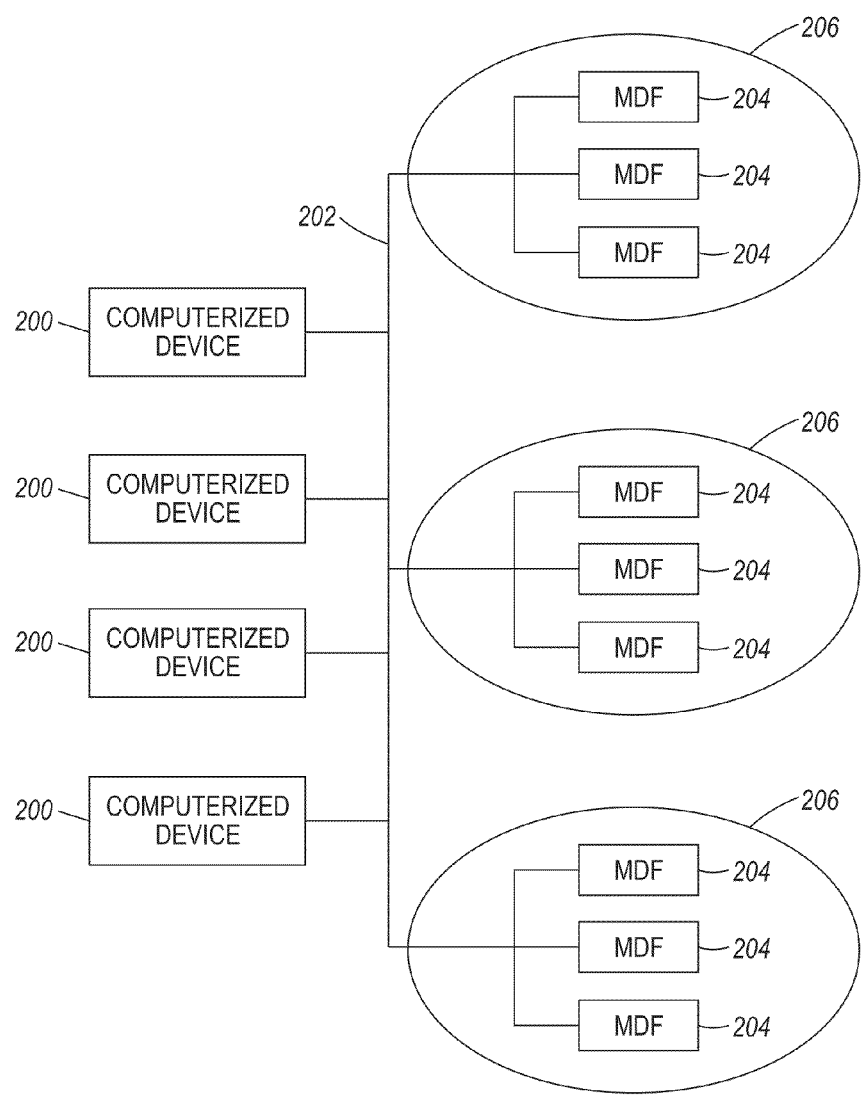
FIG. 4 is a schematic diagram of a system herein.

As shown in FIG. 4, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 5:
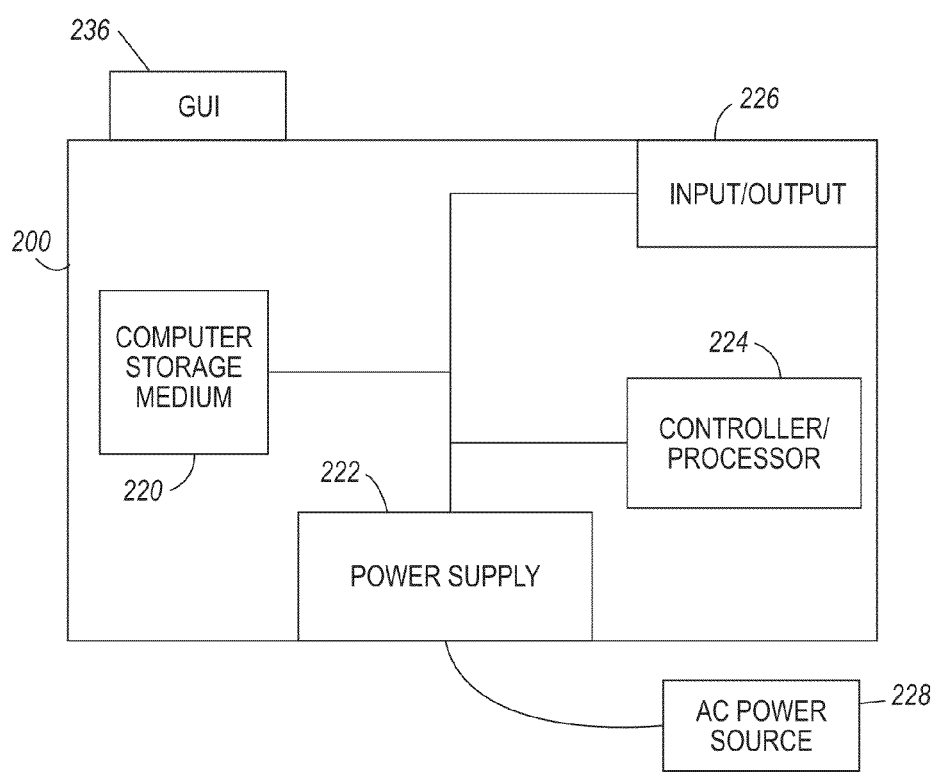
FIG. 5 is a schematic diagram of a device herein.

FIG. 5 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 5, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 6:
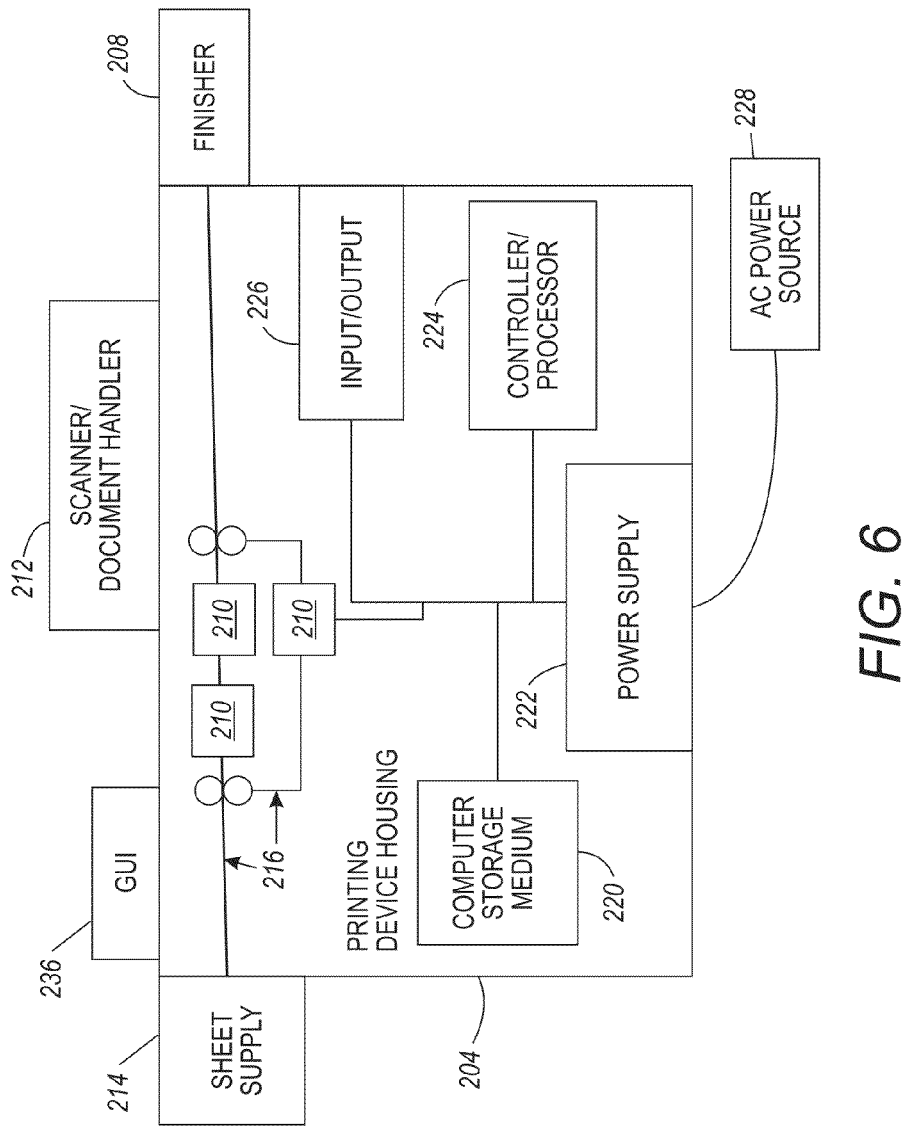
FIG. 6 is a schematic diagram of a device herein.

FIG. 6 illustrates a computerized device that is a printing device 204, which can be used with systems and methods herein and can comprise, for example, a printer, copier, multi-function machine, multi-function device (MDF), etc. The printing device 204 includes many of the components mentioned above and at least one marking device (printing engines) 210 operatively connected to the processor 224, a media path 216 positioned to supply sheets/pages of media from a sheet supply 214 to the marking device(s) 210, etc. After receiving various markings from the printing engine(s), the sheets/pages of media can optionally pass to a finisher 208 which can fold, staple, sort, etc., the various printed sheets/pages. Also, the printing device 204 can include at least one accessory functional component (such as a scanner/document handler 212, etc.) that also operate on the power supplied from the external power source 228 (through the power supply 222).

Thus, exemplary devices herein 200, 204 comprise a processor 224, an input/output device 226 operatively connected to the processor 224, and a printing engine 210 operatively connected to the processor 224. The input/output device 226 receives a print/copy job for printing on sheets/pages of media. Again, the print/copy job contains full-size pages, the sheets/pages of media have a uniform size, and the print/copy job contains initial instructions to print each of the full-size pages on a single sheet of the sheets/pages of media.

The input/output device 226 also receives secondary (N-up) instructions to combine at least two of the full-size pages on at least one sheet of the sheets/pages of media. The processor 224 automatically analyzes the item or font sizes of printable items within the full-size pages, and the processor 224 automatically determines a minimum size to which each of the full-size pages can be reduced to keep all the printable items above a minimum font size. At least two of the full-size pages have a different minimum size to which the full-size pages can be reduced based on different font sizes of the printable items within the full-size pages.

The processor 224 automatically reduces the sizes of the full-size pages as limited by each page's minimum size to produce reduced-size pages. Thus, at least two of the full-size pages are reduced by different reduction amounts. Then, the processor 224 automatically combines the reduced-size pages onto N-up pages (leaving a minimum space between the reduced-size pages) as limited by the uniform size of the sheets/pages of media. At least two of the N-up pages contain different amounts of the reduced-size pages. Then, the printing engine 210 automatically prints the finalized N-up pages.

Again, the processor 224 can change the orientation of the reduced-size pages with respect to an orientation of the sheets/pages of media when combining the reduced-size pages onto the sheets/pages of media. As mentioned above, in doing so, the processor 224 can keep the same orientation of all the reduced-size pages on each individual page of the N-up pages.

A graphic user interface can be operatively connected to the processor 224 and can display the N-up pages and providing a user option to accept or reject the N-up pages, or an option to change the minimum font size.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art. The systems and methods herein can print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving, into a computerized device, a job for printing on sheets of media, said job containing full-size pages, said sheets of media having a uniform size, and said job containing initial instructions to print each of said full-size pages on a single sheet of said sheets of media;
   receiving, into said computerized device, secondary instructions to combine at least two of said full-size pages on at least one sheet of said sheets of media;
   automatically analyzing sizes of printable items within said full-size pages, using said computerized device;
   automatically determining a minimum size to which each of said full-size pages can be reduced to keep all said printable items above a minimum print item size, using said computerized device;
   automatically reducing sizes of said full-size pages as limited by each said minimum size to produce reduced-size pages, using said computerized device;
   automatically combining said reduced-size pages onto secondary pages as limited by said uniform size of said sheets of media, using said computerized device, at least two of said secondary pages containing different amounts of said reduced-size pages;
   automatically displaying said secondary pages, using said computerized device;
   automatically providing a user option to one of accept and reject said secondary pages during said displaying of said secondary pages, using said computerized device;
   automatically providing a user option to change said minimum print item size during said displaying of said secondary pages, using said computerized device; and
   automatically outputting said secondary pages from said computerized device after said displaying said secondary pages.

2. The method according to claim 1, said combining said reduced-size pages onto said sheets of media further comprising leaving a minimum space between said reduced-size pages on each of said secondary pages.

3. The method according to claim 1, said combining of said reduced-size pages onto said sheets of media further comprising changing an orientation of said reduced-size pages with respect to an orientation of said sheets of media.

4. The method according to claim 3, said combining of said reduced-size pages onto said sheets of media further comprising keeping a same orientation of all said reduced-size pages on each individual page of said secondary pages when performing said changing of said orientation of said reduced-size pages.

5. A method comprising:
   receiving, into a computerized device, a print job for printing on sheets of media, said print job containing full-size pages, said sheets of media having a uniform size, said print job containing initial instructions to print each of said full-size pages on a single sheet of said sheets of media;
   receiving, into said computerized device, N-up instructions to combine at least two of said full-size pages on at least one sheet of said sheets of media;
   automatically analyzing font sizes of printable items within said full-size pages, using said computerized device;
   automatically determining a minimum size to which each of said full-size pages can be reduced to keep all said printable items above a minimum font size, using said computerized device, at least two of said full-size pages having a different minimum size to which said full-size pages can be reduced based on different font sizes of said printable items within said full-size pages;
   automatically reducing sizes of said full-size pages as limited by each said minimum size to produce reduced-size pages, using said computerized device, at least two of said full-size pages being reduced by different reduction amounts during said reducing;
   automatically combining said reduced-size pages onto N-up pages as limited by said uniform size of said sheets of media, using said computerized device, at least two of said N-up pages containing different amounts of said reduced-size pages; and
   automatically outputting said N-up pages from said computerized device.

6. The method according to claim 5, said combining said reduced-size pages onto said sheets of media further comprising leaving a minimum space between said reduced-size pages on each of said N-up pages.

7. The method according to claim 5, said combining of said reduced-size pages onto said sheets of media further comprising changing an orientation of said reduced-size pages with respect to an orientation of said sheets of media.

8. The method according to claim 7, said combining of said reduced-size pages onto said sheets of media further comprising keeping a same orientation of all said reduced-size pages on each individual page of said N-up pages when performing said changing of said orientation of said reduced-size pages.

9. The method according to claim 5, further comprising:
   displaying said N-up pages before said outputting; and
   providing a user option to one of accept and reject said N-up pages during said displaying of said N-up pages.

10. The method according to claim 9, further comprising providing a user option to change said minimum font size during said displaying of said N-up pages.

11. A device comprising:
   a processor; and
   an input/output device operatively connected to said processor,
   said input/output device receiving a job for printing on sheets of media,
   said job containing full-size pages,
   said sheets of media having a uniform size,
   said job containing initial instructions to print each of said full-size pages on a
   single sheet of said sheets of media,
   said input/output device said input/output device receiving secondary instructions to combine at least two of said full-size pages on at least one sheet of said sheets of media,
   said processor automatically analyzing sizes of printable items within said full-size pages,
   said processor automatically determining a minimum size to which each of said full-size pages can be reduced to keep all said printable items above a minimum print item size,
   said processor automatically reducing sizes of said full-size pages as limited by each said minimum size to produce reduced-size pages,
   said processor automatically combining said reduced-size pages onto secondary pages as limited by said uniform size of said sheets of media,
   at least two of said secondary pages containing different amounts of said reduced-size pages,
   said processor automatically displaying said secondary pages, said processor automatically providing a user option to one of accept and reject said secondary pages during said displaying of said secondary pages, said processor automatically providing a user option to change said minimum print item size during said displaying of said secondary pages, and said processor automatically outputting said secondary pages after said displaying said secondary pages.

12. The device according to claim 11, said processor combining said reduced-size pages onto said sheets of media by leaving a minimum space between said reduced-size pages on each of said secondary pages.

13. The device according to claim 1, said processor combining said reduced-size pages onto said sheets of media by changing an orientation of said reduced-size pages with respect to an orientation of said sheets of media.

14. The device according to claim 13, said processor combining said reduced-size pages onto said sheets of media by keeping a same orientation of all said reduced-size pages on each individual page of said secondary pages when changing said orientation of said reduced-size pages.

15. A printing device comprising:

a processor;

an input/output device operatively connected to said processor; and a printing engine operatively connected to said processor, said input/output device receiving a print job for printing on sheets of media, said print job containing full-size pages, said sheets of media having a uniform size, said print job containing initial instructions to print each of said full-size pages on a single sheet of said sheets of media, said input/output device receiving N-up instructions to combine at least two of said full-size pages on at least one sheet of said sheets of media, said processor automatically analyzing font sizes of printable items within said full-size pages, said processor automatically determining a minimum size to which each of said full-size pages can be reduced to keep all said printable items above a minimum font size, at least two of said full-size pages having a different minimum size to which said full-size pages can be reduced based on different font sizes of said printable items within said full-size pages, said processor automatically reducing sizes of said full-size pages as limited by each said minimum size to produce reduced-size pages, at least two of said full-size pages being reduced by different reduction amounts, said processor automatically combining said reduced-size pages onto N-up pages as limited by said uniform size of said sheets of media, at least two of said N-up pages containing different amounts of said reduced-size pages, and said printing engine automatically printing said N-up pages.

16. The printing device according to claim 15, said processor leaving a minimum space between said reduced-size pages on each of said N-up pages.

17. The printing device according to claim 15, said processor combining said reduced-size pages onto said sheets of media by changing an orientation of said reduced-size pages with respect to an orientation of said sheets of media.

18. The printing device according to claim 17, said processor combining said reduced-size pages onto said sheets of media by keeping a same orientation of all said reduced-size pages on each individual page of said N-up pages when said changing said orientation of said reduced-size pages.

19. The printing device according to claim 15, further comprising a graphic user interface operatively connected to said processor, said graphic user interface:

displaying said N-up pages before said outputting; and providing a user option to one of accept and reject said N-up pages during said displaying of said N-up pages.

20. The printing device according to claim 19, said graphic user interface providing a user option to change said minimum font size during said displaying of said N-up pages.

\* \* \* \* \*

UNITED STATES PATENT AND TRADEMARK OFFICE
CERTIFICATE OF CORRECTION

PATENT NO.         : 9,087,287 B2
APPLICATION NO.    : 13/799017
DATED              : July 21, 2015
INVENTOR(S)        : Sainarayanan Gopalakrishnan et al.

Page 1 of 1

It is certified that error appears in the above-identified patent and that said Letters Patent is hereby corrected as shown below:

In the drawings, Sheet 4, Figure 4, reference numeral 204 should read --MFD--.

Signed and Sealed this
Second Day of February, 2016

Michelle K. Lee
*Director of the United States Patent and Trademark Office*